«12» United States Patent
Cutlip

(10) Patent No.: US 6,886,173 B2
(45) Date of Patent: Apr. 26, 2005

(54) METHODS, SYSTEMS AND COMPUTER PROGRAM PRODUCTS FOR COUPLING ELECTRONIC MAIL AND RELATIONAL DATABASE FUNCTIONS

(75) Inventor: Robert Russell Cutlip, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 09/867,911

(22) Filed: May 30, 2001

(65) Prior Publication Data

US 2002/0194395 A1 Dec. 19, 2002

(51) Int. Cl.[7] ................................................ G06F 9/46
(52) U.S. Cl. .................... 719/328; 719/318; 707/103 R
(58) Field of Search ................................ 719/318, 328; 707/103 R; 709/203, 206, 320, 328

(56) References Cited

U.S. PATENT DOCUMENTS

| 5,548,753 | A | * | 8/1996 | Linstead et al. ............... 707/1 |
| 5,734,901 | A | | 3/1998 | Sidhu et al. ................. 395/680 |
| 5,826,269 | A | * | 10/1998 | Hussey ......................... 707/10 |
| 5,878,230 | A | | 3/1999 | Weber et al. .......... 395/200.68 |
| 6,405,212 | B1 | * | 6/2002 | Samu et al. ............. 707/103 R |
| 6,658,453 | B1 | * | 12/2003 | Dattatri ....................... 709/217 |
| 2002/0120690 | A1 | * | 8/2002 | Block .......................... 709/206 |
| 2002/0138497 | A1 | * | 9/2002 | Chen et al. ............... 707/104.1 |
| 2002/0156688 | A1 | * | 10/2002 | Horn et al. .................... 705/26 |
| 2002/0169835 | A1 | * | 11/2002 | Paul et al. .................. 709/206 |

OTHER PUBLICATIONS

Tony Nemil and Anil Hemrajani, "Introduction to the Java Mail API," Jun. 1999, retrieved from JavaWorld.com.*
Cutlip, "Integrating Relational Databases and Internet Mail," DB2 Magazine (Winter 2000), http://www.db2mag.com/db_area/archives/2000/q4/cutlip.shtml.

* cited by examiner

Primary Examiner—Meng-Al T. An
Assistant Examiner—Li Zhen
(74) Attorney, Agent, or Firm—Timothy J. O'Sullivan; Myers Bigel Sibley & Sajovec; Gerald R. Woods

(57) ABSTRACT

Methods, systems and computer program products provide for generating an electronic mail message by automatically generating an electronic mail message responsive to an action being performed on a database entry. In particular embodiments of the present invention, performance of an action on the entry in the database is detected and a user defined function (UDF) of the database triggered which provides access to an electronic mail system. The UDF is triggered in response to the detection of performance of the action on the entry. The electronic mail system is accessed utilizing the UDF to generate the electronic mail message responsive to the UDF being triggered. Thus, an electronic mail message may be automatically generated via triggers and user defined functions which may be provided by the programmatic use of layering and abstraction.

13 Claims, 5 Drawing Sheets

METHODS, SYSTEMS AND COMPUTER PROGRAM PRODUCTS FOR COUPLING ELECTRONIC MAIL AND RELATIONAL DATABASE FUNCTIONS

FIELD OF THE INVENTION

The present invention relates to electronic mail (e-mail) and, more particulary, to the generation of e-mail.

BACKGROUND OF THE INVENTION

In electronic business (e-business), where typically several companies may provide similar goods or services, loyalty of customers may be important in the success of a business. Such loyalty may, for example, be gained by being responsive to customers and by maintaining contact with customers on an ongoing basis. On tool for customer outreach and relationship building is electronic mail (e-mail). In fact, customer feedback (such as registration thank-you notes, target marketing offers, and order status updates) can become a positive market differentiator.

In such an environment, speed, efficiency, and responsiveness may be important to success. Therefore, e-mail outreach to customers should be accomplished in a timely manner and, preferably, as efficiently as possible.

Accordingly, the quality of the business process implementation can be just as important as the content of the e-mail message itself. Thus, a need exists for efficient e-mail message generation suitable for use, for example, in e-business.

SUMMARY OF THE INVENTION

Embodiments of the present invention provide methods, systems and computer program products for generating an electronic mail message by automatically generating an electronic mail message responsive to an action being performed on a database entry. In particular embodiments of the present invention, performance of an action on the entry in the database is detected and a user defined function (UDF) of the database triggered which provides access to an electronic mail system. The UDF is triggered in response to the detection of performance of the action on the entry. The electronic mail system is accessed utilizing the UDF to generate the electronic mail message responsive to the UDF being triggered.

In further embodiments of the present invention, detecting performance of the action and triggering a user defined function may be provided by establishing a database trigger associated with entries in the database which activates the UDF upon an action being performed on the entries associated with the trigger. Furthermore, the UDF may obtain electronic mail information associated with the entry in the database and provide the electronic mail information to an application program interface for the electronic mail system. Such an application program interface may provide abstract layering for the underlying electronic mail system. Also, the UDF may have a first class which obtains the electronic mail information and a second class which provides the electronic mail message information to the electronic mail system.

In particular embodiments of the present invention, the application program interface may be the JavaMail Application Program Interface. Furthermore, the action performed on the database entry which causes the trigger to be activated may be an insertion of the entry into the database. In certain embodiments of the present invention, the database is a DB2 database. Also, the electronic mail system may execute on a data processing system remote from a data processing system on which the database executes.

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
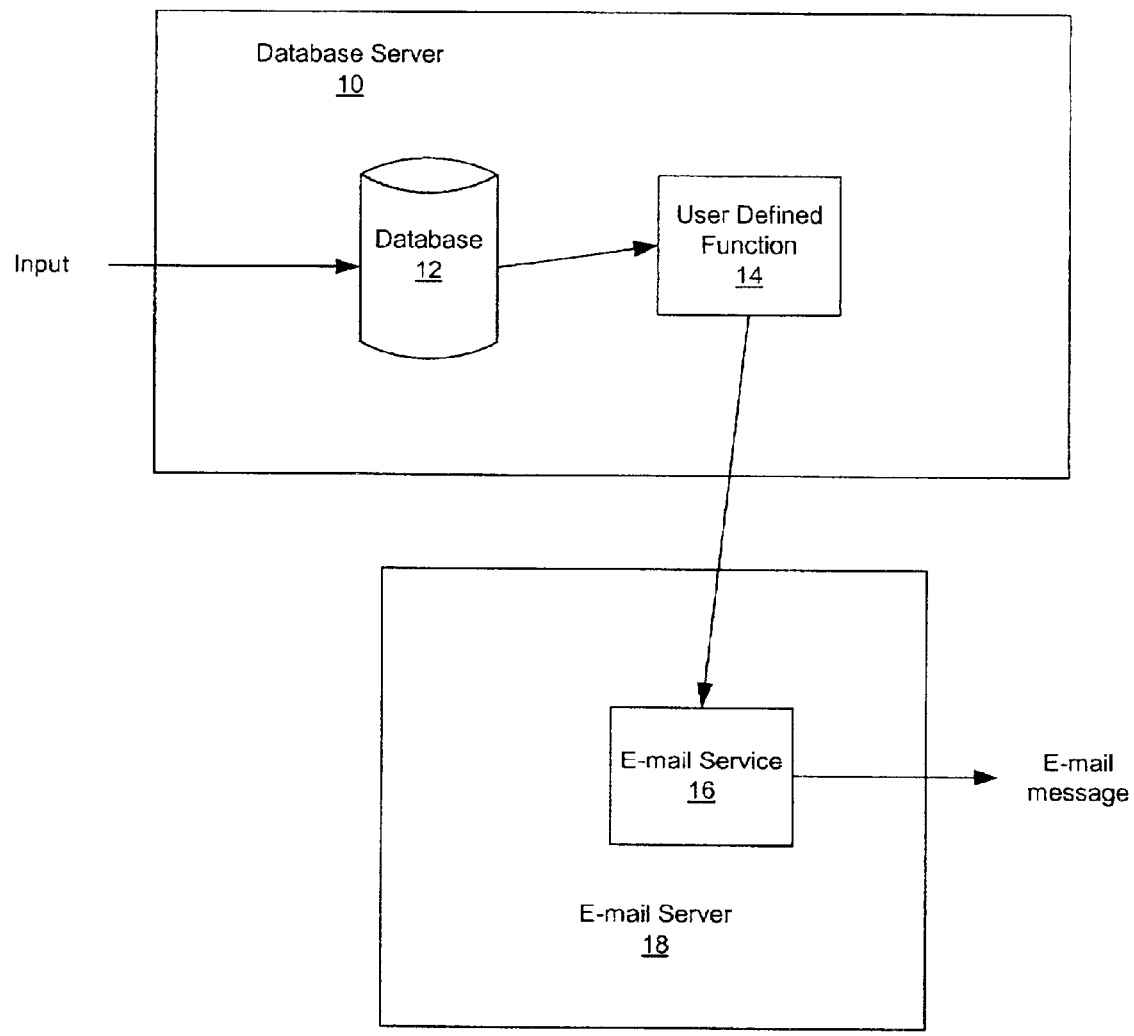
FIG. 1 is a block diagram illustrating a system incorporating embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to the figures. FIG. 1 illustrates a system for e-mail generation according to embodiments of the present invention. As seen in FIG. 1, a database server 10 includes a database 12 and a user defined function (UDF) 14 which provides abstract layering for underlying electronic mail services, such as the e-mails service 16 provided by the e-mail server 18. When input is received by the database 12 which causes an action to be performed on an entry in the database 12, a database trigger of the database 12 invokes the e-mail user defined function 14. The user defined function 14 instructs the e-mail service 16 to send an e-mail message as a result of the action on the entry in the database 12.

As described above, embodiments of the present invention may use a database UDF to provide automatic generation of e-mails. In a relational database, UDFs can help streamline e-business operations. UDFs may facilitate close integration of object/relational database system function and e-business processes. With UDFs, processes may be closely intergrated, data integrity may be ensured, and/or costly application programming and reprogramming may be avoided. In addition, UDFs and other elements of server-side logic (such as stored procedures) may minimize the amount of network traffic necessary to accomplish a piece of work, resulting in higher performance.

While embodiments of the present invention are described herein with reference to FIG. 1, as will be appreciated by those of skill in the art in light of the present disclosure, the present invention may be utilized in other configurations. For example, while the e-mail server 18 and database server 10 are illustrated as separate data processing systems in FIG. 1, they could be combined onto a single data processing system. Furthermore, multiple data processing systems could be provided for either the database server 10 and/or the e-mail server 18. Accordingly, embodiments of the present invention should not be construed as limited to the configuration illustrated in FIG. 1 as the present invention encompasses any configuration capable of carrying out the operations described herein.

Figure 2:
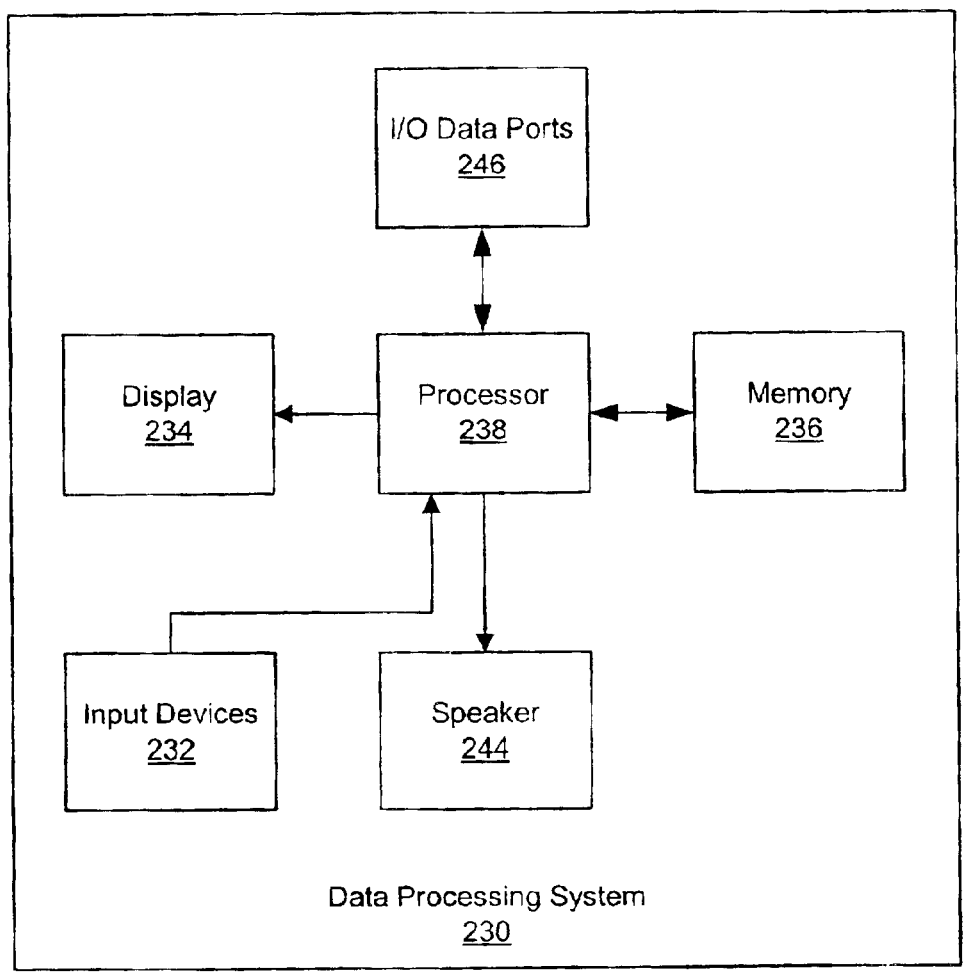
FIG. 2 is a block diagram of a data processing system according to embodiments of the present invention.

FIG. 2 illustrates an exemplary embodiment of a data processing system 230 suitable in accordance with embodiments of the present invention. The data processing system 230 typically includes input device(s) 232 such as a keyboard or keypad, a display 234, and a memory 236 that communicate with a processor 238. The data processing system 230 may further include a speaker 244, and an I/O data port(s) 246 that also communicate with the processor 238. The I/O data ports 246 can be used to transfer information between the data processing system 230 and another computer system or a network. These components may be conventional components such as those used in many conventional data processing systems which may be configured to operate as described herein.

Figure 3:
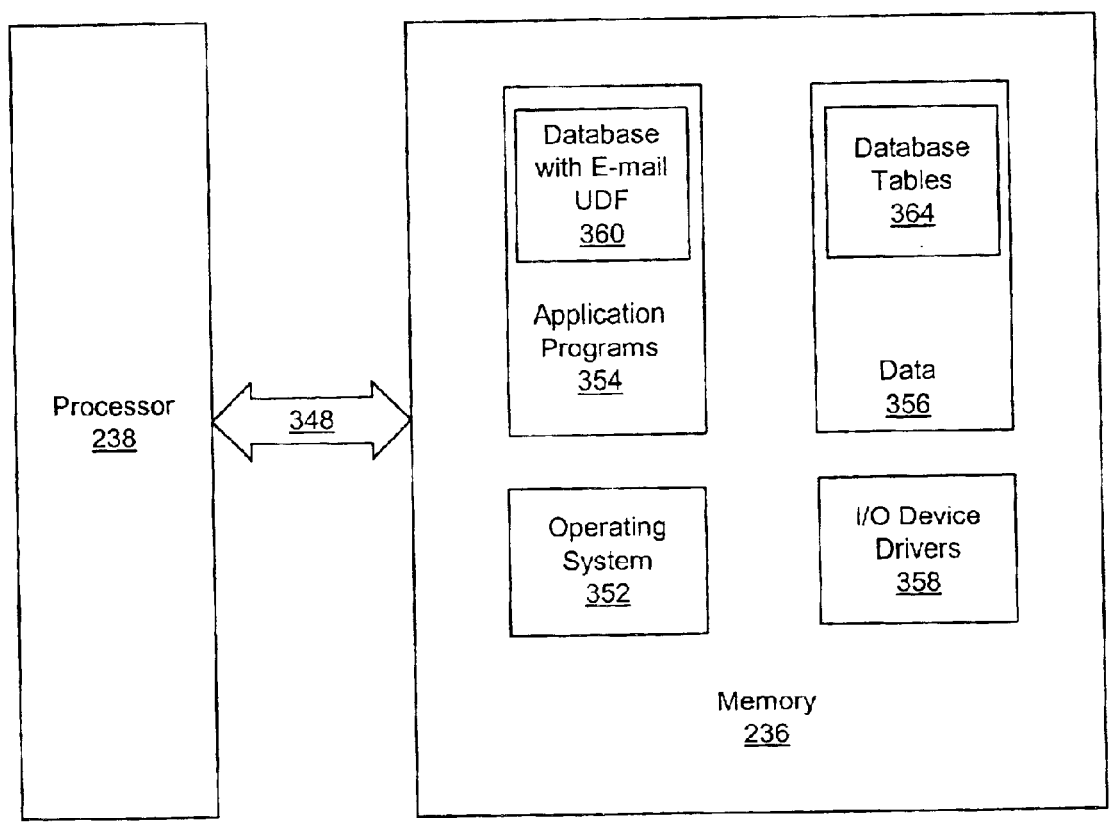
FIG. 3 is a more detailed block diagram of a data processing system according to embodiments of the present invention.

FIG. 3 is a block diagram of data processing systems that illustrates systems, methods, and computer program products in accordance with embodiments of the present invention. The processor 238 communicates with the memory 236 via an address/data bus 348. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing system 230: the operating system 352; the application programs 354; the input/output (I/O) device drivers 358; and the data 356. As will be appreciated by those of skill in the art, the operating system 352 may be any operating system suitable for use with a data processing system, such as OS/2, AIX or System390 from International Business Machines Corporation, Armonk, N.Y., Windows95, Windows98 or Windows2000 from Microsoft Corporation, Redmond, Wash., Unix or Linux configured to support an TCP/IP-based protocol connection. The I/O device drivers 358 typically include software routines accessed through the operating system 352 by the application programs 354 to communicate with devices such as the I/O data port(s) 246, the data storage 235 and certain memory 236 components. The application programs 354 are illustrative of the programs that implement the various features of the data processing system 230 and preferably include at least one application which supports operations according to embodiments of the present invention. Finally, the data 356 represents the static and dynamic data used by the application programs 354, the operating system 352, the I/O device drivers 358, and other software programs that may reside in the memory 236.

As is further seen in FIG. 3, the application programs 354 may include a database with e-mail UDF 360. The database with e-mail UDF 360 may carry out the operations described herein for generation of e-mails in response to an action being performed on an entry in the database. The data portion 356 of memory 236, as shown in the embodiments of FIG. 3, may include database tables 364.

While the present invention is illustrated, for example, with reference to a particular configuration in FIG. 3, as will be appreciated by those of skill in the art, other configurations may also be utilized while still benefitting from the teachings of the present invention. Thus, the present invention should not be construed as limited to the configuration of FIG. 3 but is intended to encompass any configuration capable of carrying out the operations described herein.

Figure 4:
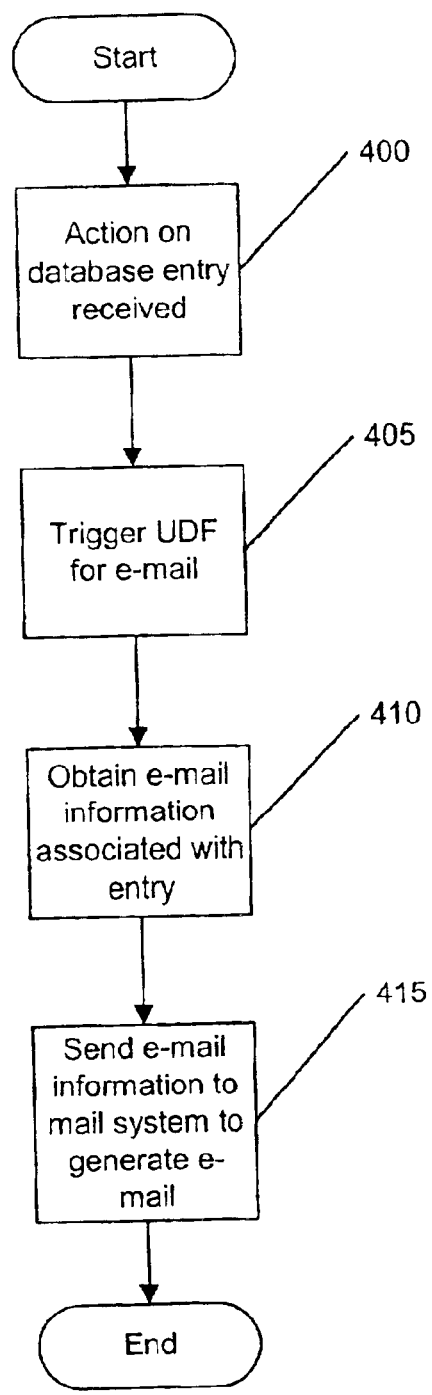
FIG. 4 is a flowchart illustrating operations according to embodiments of the present invention.

Operations according to embodiments of the present invention, will now be described with reference to the exemplary network diagram of FIG. 1 and the flowcharts of FIGS. 4 and 5. As seen in FIG. 4, the database 12 receives input requesting performance of an action on a database entry (block 400). Such an action may, for example, be creation of an entry (e.g. insertion of a row in a database table), deletion of an entry or modification of an entry.

Performance of the action on the database entry causes a database trigger to invoke the e-mail user defined function (UDF) 14 (block 405). The UDF 14 obtains information about the e-mail message to generate, such as the recipient, message content and the like, which are associated with the entry on which the action was performed and/or with the action performed (block 410). The UDF 14 sends the e-mail information to the e-mail service 16 to cause the e-mail message to be sent (block 415).

Figure 5:
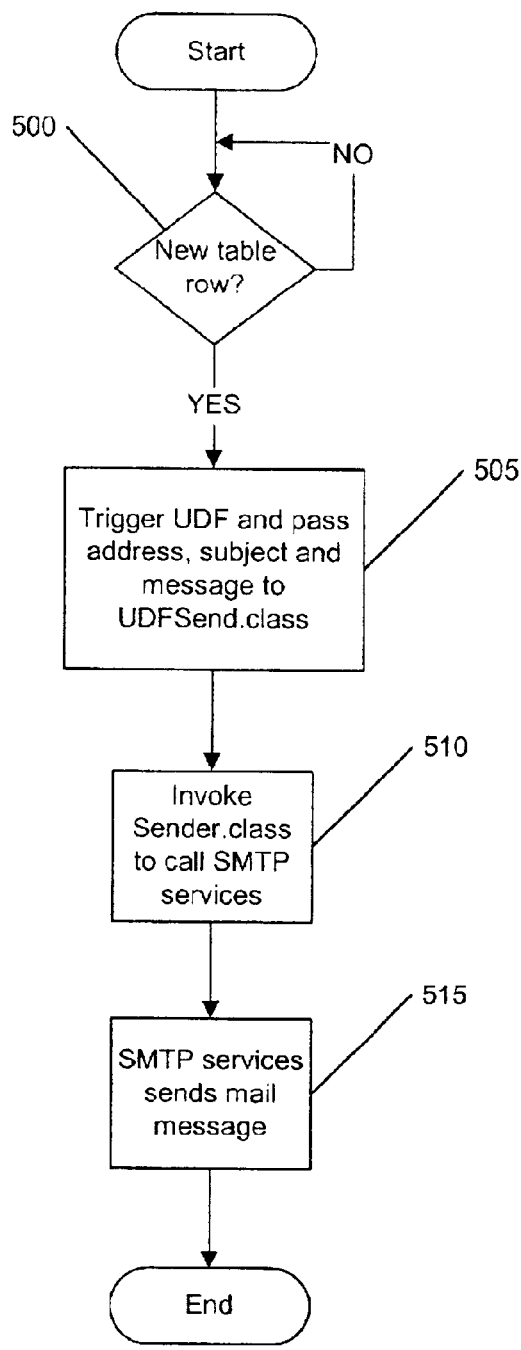
FIG. 5 is a flowchart illustrating operations according to further embodiments of the present invention.

FIG. 5 is a flowchart illustrating operations according to further embodiments of the present invention. FIG. 5 will be described with reference to a particular example of the present invention as a program for a Web registration process that takes client-supplied information, stores it in DB2 Universal Database (UDB), then sends an appropriate e-mail (such as a thank you note or marketing offer) in response. In the present example, when a customer visits a Web site and registers to receive additional information, a Sendmail UDF trigger fires when the registration is complete. Using the personal details the customer volunteered, the Sendmail UDF composes an appropriate e-mail (such as a thank you or confirmation e-mail with additional access information), and sends it to the customer.

In the present example, the JavaMail application programming interface (API) from Sun Microsystems Inc., provides a "wrapper," or abstract layering, for underlying mail programs and protocols. This abstract layer declares classes, interfaces, and abstract methods to support the mail handling functions that are typically provided by mail systems. Part of this abstract layering of mail system functions is implemented using Internet standards. A wrapper may allow changes to be made without altering the underlying program. Instead of rewriting or modifying the underlying program, Java programming code may be provided that "wrappers" the function. By using Java Mail and the Java Application Framework (JAF), the existing mail infrastructure may be layered on top of so that the mail programs themselves need not be changed. If Sendmail changes or falls out of fashion, but the underlying protocols stay the same, the program should still work. If the message the UDF sends requires changing, the changes are made to the UDF, not the underlying mail program. In fact, a future maintenance programmer doesn't even have to fully understand the underlying mail program, only the Java wrapper.

To provide portability, the UDF may be written in Java, however, other programming languages may be used. In the present example, the Java UDF uses Sun's JavaMail 1.1.3 API and JAF v1.0.1. JavaMail makes the calls to the underlying transport protocol (in the present example, SMTP running on a remote AIX machine) and provides a common API for managing e-mail. The Java UDF uses the JavaMail API to send messages. The JavaMail API also provides the capability to access message stores and to compose and send messages. To achieve this functionality, the JavaMail API provides the four abstract classes: transport, message, folder, and store. When the UDF in these examples sends mail, it uses the message and transport classes to access services in the implementation layer. In the particular exemplary embodiments, an IBM RS/6000 machine provides the SMTP transport services.

The JAF specification is a data typing and registry technology that is a standardized extension to the Java platform. JAF extends the Java Development Kit (JDK) activation framework by encapsulating access to data and instantiating components that correspond to mail operations on the e-mail data. The Sun JavaMail API and JAF may provide levels of abstraction and enhanced portability.

Returning to FIG. 5, the insertion of a new row into a database table is detected (block 500). A database trigger associated with the table calls the UDF stored in the database, passing it e-mail parameters, such as address of the recipient, subject, and message (block 505). The UDF itself is composed of two classes, UDFSend.class and Sender.class. The UDFSend.class receives the e-mail parameters and provides them to the Sender.class. Sender.class makes the call to SMTP services running on a remote mail server (block 510). Responsive to receiving the call from Sender.class, the mail server sends the message (block 515).

These operations will now be described in detail for the present exemplary embodiments. Blocks 500 and 505 describe a database trigger being activated when a row is inserted into a database table. Triggers in relational database systems define a set of actions that are activated, or triggered, by DELETE, INSERT, or UPDATE operations on a specified table. Triggers can be used to enforce data integrity and transitional business rules or, as in this example, to invoke functions that perform tasks. The Java code sample in Listing 1 (below) creates a trigger named AC, which is activated after INSERT into the RTPI1103.E-mail table.

---

Listing 1: Defining the trigger.

```
// Create the e-mailUDF Trigger
public static void
registerTrigger (Connection con) throws Exception
{ try
{ Statement registerStmt = con.createStatement ( );
System.out.println (" Registering Java trigger: AC");
registerStmt.executeUpdate (
" CREATE TRIGGER RTPI103.AC " +
" AFTER INSERT ON RTPI103.Email " +
" REFERENCING NEW AS N_ROW " +
" FOR EACH ROW MODE DB2SQL " +
" BEGIN ATOMIC " +
" VALUES (EmailUDF (N_ROW.RECEIVER,
N_ROW.SUBJECT,
N_ROW.MESSAGE) ); " +
" END " );
} . . .
```

---

The receiver, subject, and message values for the newly inserted row, N_ROW, are passed to the UDF called emailUDF by the action of the trigger.

UDFs in relational database systems are often extensions or additions to existing functions. Different types of UDFs may be provided, including column, table, and scalar functions. Like most functions, UDFs return some value. For example, table functions return a table and column and scalar functions return single values. In the present example, scalar functions are utilized. The code in Listing 2 (below) registers the external scalar UDF with DB2. The first section of the create function block illustrates how to declare the input parameters as type VARCHAR and the return value as type INT. The external name declaration defines the name of the UDF as emailUDF and the Java class associated with it as UDFsend class. The definition block also illustrates how to declare that the UDF has external action (in other words, it causes an action outside of the database system).

---

Listing 2: Registering the external scalar UDF.

```
// Register the UDFs
public static void
registerUDFs (Connection con) throws Exception
{ try
{ Statement registerStmt = con.createStatement ( );
// scalar emailUDF
System.out.println (" Registering Java UDF: emailUDF");
```

-continued

Listing 2: Registering the external scalar UDF.

```
registerStmt.executeUpdate (
" CREATE FUNCTION emailUDF ( VARCHAR(200),
VARCHAR(200),
VARCHAR(700) ) " +
" RETURNS int " +
" EXTERNAL NAME 'UDFsend!emailUDF' "+
" LANGUAGE java " +
" PARAMETER STYLE JAVA " +
" DETERMINISTIC " +
" FENCED " +
" NOT NULL CALL " +
" NO SQL " +
" EXTERNAL ACTION " +
" SCRATCHPAD " +
" FINAL CALL " +
" ALLOW PARALLEL " +
" NO DBINFO");
registerStmt.close ( );
}
```

To use the JavaMail program and JAF with the UDF code, two classes are created: UDFSend.class and Sender.class. Using two separate classes may facilitate development and debugging. The UDFSend.class was called by the emailUDF registered in Listing 2. The UDFSend.class performs two main functions: It accepts input arguments, such as address, subject, and message, and passes them to the Sender.class. The Sender.class actually makes the calls to the mail handling functions residing on the remote RS/6000 machines.

In the sample of the UDFSend.class code in Listing 3 (below), UDFSend extends UDF. In the present example, it takes the address, subject, and message strings as inputs and returns the string length of the message, which was used for program debugging. Within the try and catch block a new instance of Sender is created, passing it the URL of our remote mail server. While not all of the code associated with UDFSend.class is illustrated, the EmailSend() and Email To() methods map to the Sender.class code.

Listing 3: A sample of the UDFSend.class code.

```
UDFSend.class:
class UDFsend extends UDF
{ // the emailUDF UDF
public void
emailUDF(String inputAddr, String inputSubject,
    String inputmessage,
int outputStrLen) throws Exception
{ try
{ // set(4, inputmessage.length( ) );
Sender smtp = new Sender("xxx.yyy.zzz.com");
/* EmailTo( ) */
if ( !smtp.EmailTo(inputAddr) ) {
//System.out.println(" EmailTo failed");
System.exit(1);
}
/* Call EmailSend( ) */
if ( !smtp.EmailSend(inputmessage) ) {
System.out.println("Send Message failed");
System.exit(1);
}
// System.out.println("Sender successful");
//System.exit(0);
}
catch (Exception e)
{ throw e;
}
}
```

The constructor of the Sender.class that actually sends the e-mail message receives the "host string," which is the URL of the SMTP host. In Java, a constructor is an instance method with the same name as its class. There are a number of methods in Sender.class, two of which are shown in the example in Listing 4 (below). Other methods handle Reply To, CC, From, and Subject information. For a complete discussion of available methods, see Sun Microsystems's JavaMail API design specification. As with Listing 3, Listing 4 is an exemplary portion of the code for the Sender.class. Remaining portions of the code of Listing 3 and Listing 4 will be readily apparent to those of skill in the art in light of discussion in the present disclosure and, therefore, will not be described further herein.

Listing 4: Two methods in Sender.class.

```
Sender.class:
class Sender { . . .
// Host String containing the
// address of the smtp mail host.
Sender(String host) {
props = new Properties( );
props.put("mail.smtp.host", host);
session = Session.getDefaultInstance(props, null);
session.setDebug(debug);
message = new MimeMessage(session);
}
//
public boolean EmailTo(String emailto) {
boolto=true;
try {
message.addRecipient(Message.RecipientType.TO,
new InternetAddress(emailto));
} catch (MessagingException mex) {
return false;
}
return true;
};
//
public boolean EmailSend(String messageText) {
if ( !boolto ) return false;
if ( !boolfrom ) return false;
if ( !boolsubject ) return false;
try
message.setSentDate(new Date( ));
message.setText(messageText.toString( ));
Transport.send(message);
} catch (MessagingException mex) {
return false;
}
return true; }
```

The flowcharts and block diagrams of FIGS. 1 through 5 illustrate the architecture, functionality, and operation of possible implementations of systems, methods and computer program products for e-mail generation according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of generating an electronic mail message, comprising:

automatically generating an electronic mail message responsive to an action being performed on a database entry, wherein generating an electronic mail message comprises:

detecting performance of the action performed on the database entry;

triggering a user defined function (UDF) of the database which provides access to an electronic mail system in response to the detection of performance of the action on the database entry;

accessing the electronic mail system utilizing the UDF to request generation of the electronic mail message responsive to the UDF being triggered;

wherein detecting performance of the action and triggering a user defined function comprise establishing a database trigger associated with entries in the database, which database trigger activates the UDF upon an action being performed on at least one of the entries associated with the database trigger;

wherein the UDF carries out the steps of:

obtaining electronic mail information associated with the entry in the database; and providing the obtained electronic mail information to an application program interface for the electronic mail system; and wherein the application program interface provides abstract layering for the electronic mail system.

2. The method of claim 1, wherein the application program interface comprises the JavaMail Application Program Interface.

3. The method of claim 1, wherein the action performed comprises an insertion of the entry into the database.

4. The method of claim 1, wherein the database comprises a DB2 database.

5. The method of claim 1, wherein the UDF comprises a first class which obtains the electronic mail information and a second class which provides the electronic mail message information to the electronic mail system.

6. The method of claim 1, wherein the electronic mail system executes on a second data processing system remote from a first data processing system on which the database executes.

7. A system for generating an electronic mail message, comprising:

a database having database entries;

a user defined function of the database configured to wrap access to an electronic mail system so as to generate an electronic mail message upon invocation of the user defined function; and a database trigger associated with at least one of the database entries and configured to invoke the user defined function upon performance of an action on the at least one of the database entries;

wherein the user defined function comprises a first class which obtains electronic mail information associated with the database entry and a second class which provides the electronic mail message information to the electronic mail system; and wherein the user defined function configured to wrap access to the electronic mail system utilizing an application program interface which provides abstract layering for the electronic mail system.

8. The system of claim 7, wherein the application program interface comprises a JavaMail application program interface.

9. The system of claim 7, wherein the action performed comprises an insertion of the entry into the database.

10. A system for generating an electronic mail message, comprising:

means for detecting performance of an action performed on an entry in a database;

means for triggering a user defined function (UDF) of the database which provides access to an electronic mail system in response to the detection of performance of the action on the entry;

means for accessing the electronic mail system utilizing the UDF to initiate generation of the electronic mail message responsive to the UDF being triggered;

wherein the user defined function comprises a first class which obtains electronic mail information associated with the database entry and a second class which provides the electronic mail message information to the electronic mail system; and wherein the UDF is configured to wrap access to the electronic mail system utilizing an application program interface which provides abstract layering for the electronic mail system.

11. The system of claim 10, wherein the action performed comprises an insertion of the entry into the database.

12. A computer program product for generating an electronic mail message, comprising:

a computer readable media having computer readable program code embodied therein, the computer readable program code comprising:

computer readable program code that detects performance of an action performed on an entry in a database;

computer readable program code which triggers a user defined function (UDF) of the database which provides access to an electronic mail system in response to the detection of performance of the action on the entry;

computer readable program code which accesses the electronic mail system utilizing the UDF to initiate generation of the electronic mail message responsive to the UDF being triggered;

wherein the user defined function comprises a first class which obtains electronic mail information associated with the database entry and a second class which provides the electronic mail message information to the electronic mail system; and wherein the UDF is configured to wrap access to the electronic mail system utilizing an application program interface which provides abstract layering for the electronic mail system.

13. The computer program product of claim 12, wherein the action performed comprises an insertion of the entry into the database.

* * * * *